March 26, 1957  M. M. SCHANKLER  2,786,498
MULTIPURPOSE WOODWORKING MACHINE OR THE LIKE
Filed June 24, 1954  2 Sheets-Sheet 1
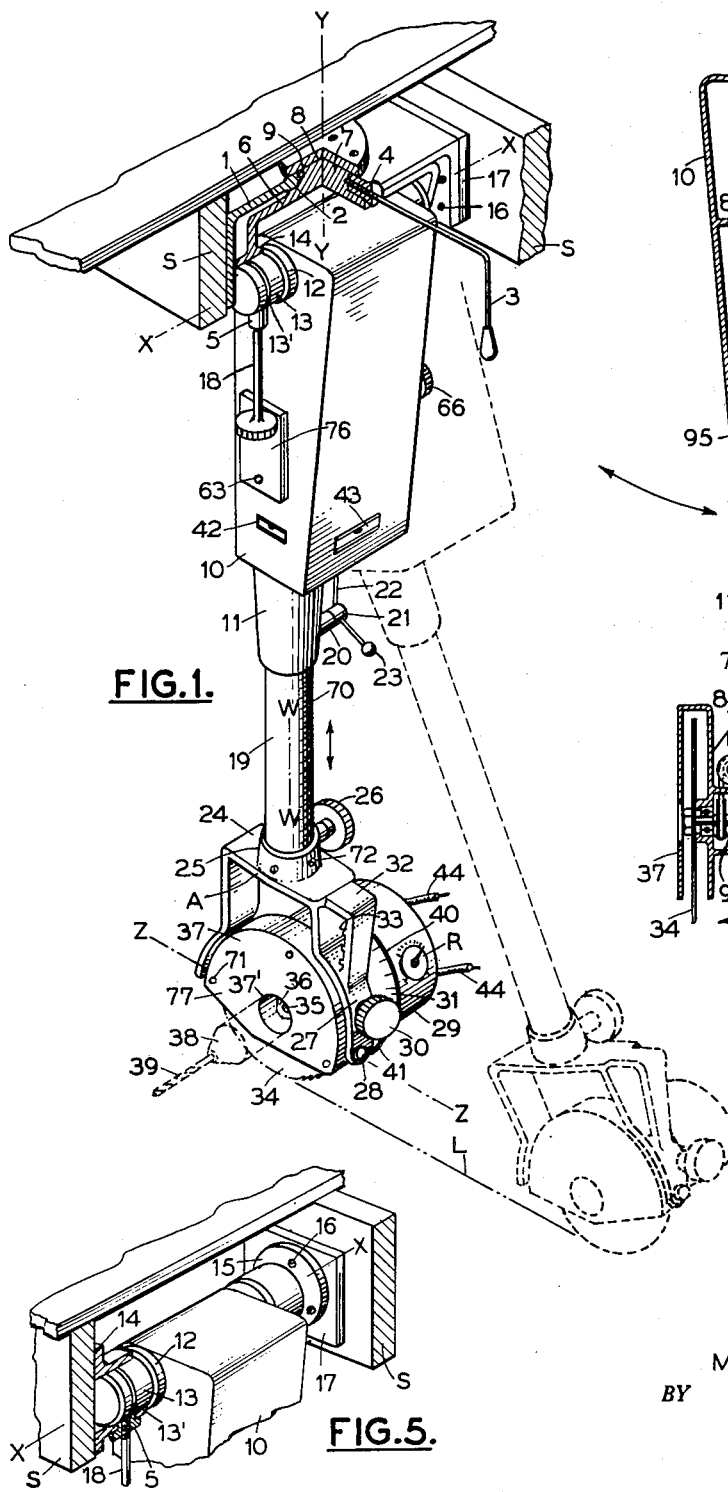
FIG.1.
FIG.5.
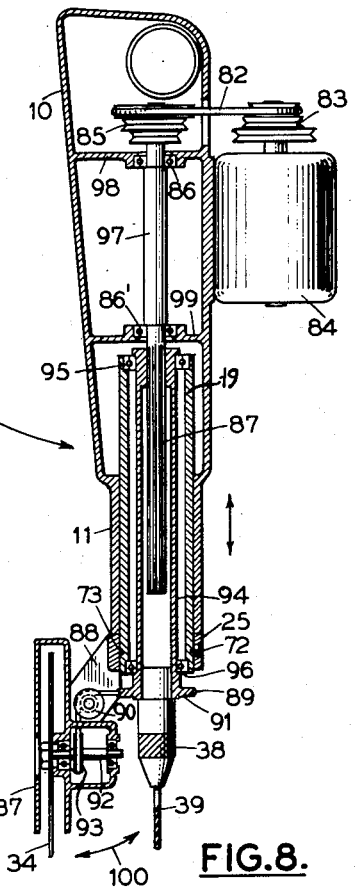
FIG.8.
INVENTOR.
MARTIN M. SCHANKLER
BY
J. B. Burke
ATTORNEY March 26, 1957   M. M. SCHANKLER   2,786,498
MULTIPURPOSE WOODWORKING MACHINE OR THE LIKE
Filed June 24, 1954   2 Sheets-Sheet 2
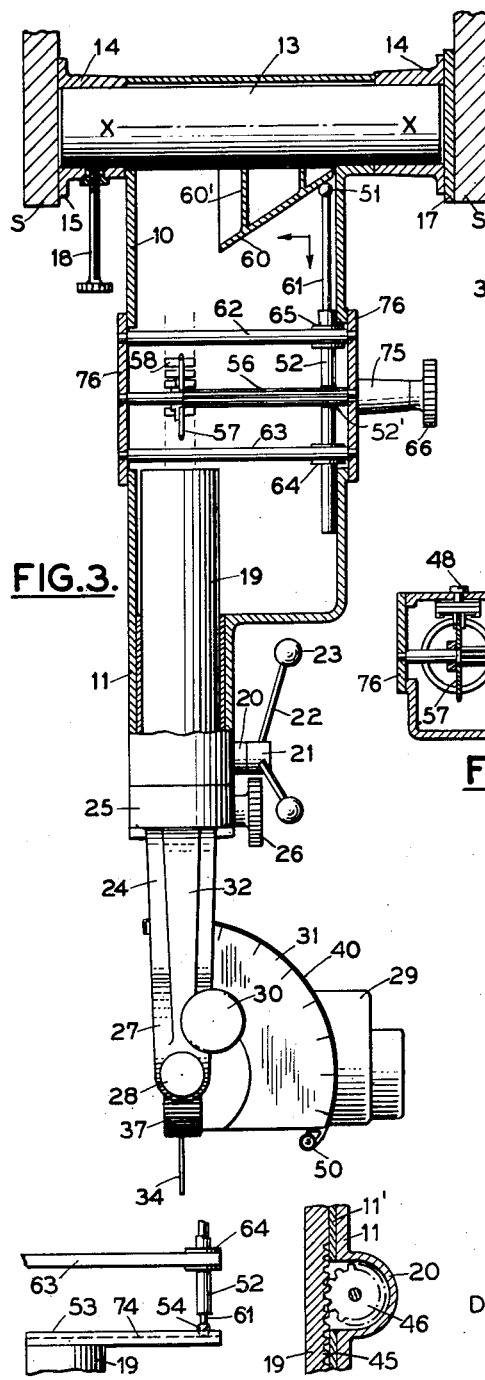
FIG.3.
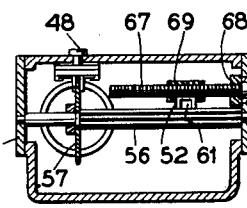
FIG.9.
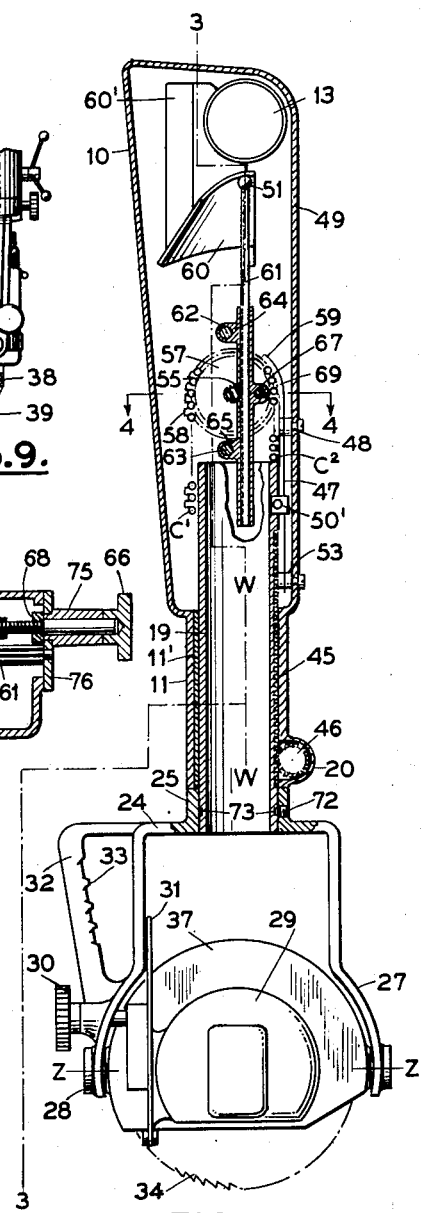
FIG.4.
FIG.2.
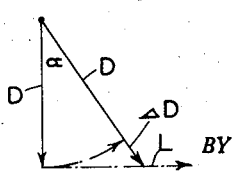
FIG.7.   FIG.10.   FIG.6.
INVENTOR.
MARTIN M. SCHANKLER
BY
J. B. Burke
ATTORNEY

United States Patent Office 2,786,498
Patented Mar. 26, 1957

2,786,498

MULTIPURPOSE WOODWORKING MACHINE OR THE LIKE

Martin M. Schankler, Park Ridge, N. J.

Application June 24, 1954, Serial No. 439,046

6 Claims. (Cl. 144—35)

This invention relates to the art of multipurpose tools and particularly concerns a machine including a novel carrier or holder for a power tool useful for supporting the tool in any desired working position, such machine being principally intended for woodworking but adapted for working metals, plastics, and other rigid materials.

It has been known that most woodworking cuts as well as light metal-working cuts may be accomplished by use of a suitable power saw and drill press together with an appropriate collection of cutting, grinding, and abrading attachments for these two types of machines. Provision of both of these two machines in the small home or industrial workshop is often precluded because of limited space and prohibitive expense. The present invention combines these two types of machines into one relatively inexpensive unit and includes a new type of suspension therefor. This machine may be used and stored in a very limited space and can handle work of a size limited only by the size of the workshop.

The invention is embodied in a machine adapted to perform functions of a power saw, drill press, router, sander, grinder, buffer and other tools. As a power saw the machine can be used to perform functions of a table saw, radial saw, and swing or cut off saw. As a drill press, the machine can be used to perform drilling operations in horizontal, vertical and oblique directions. The machine will handle work of extended lengths and widths which cannot be handled by conventional multipurpose woodworking machines.

A principal disadvantage of conventional woodworking machines is that they occupy floor space which in most installations is quite valuable. In some installations the presence of such machines interferes with other purposes to which the floor space might be put. A further limitation of conventional machines of the character described is the limited sizes of material they can effectively handle. In many cases one or two feet in length or width marks the limit of their work handling capabilities.

The present invention overcomes the limitations and disadvantages of conventional machines above mentioned by providing a machine which is relatively simple in construction, inexpensive to install and easy to use. The machine occupies no floor or wall space otherwise useful, and when not in use may be disposed in a position completely clear of the normal working area where it is installed. The machine has unlimited versatility in the scope of operations it can perform and is even capable of performing wood working operations never before possible with conventional woodworking machines. No limit is placed on the length, width or thickness of the work the machine can handle. During use, the material being worked on in most cases need not be moved, because the working point of the tool has a degree of mobility unusual in a machine of this character. For example, if a circular saw blade is the working tool, the cutting edge may be moved in a straight line in any desired direction. If the working tool is a drill bit, the bit may be caused to travel in a straight line in any desired direction. With suitable attachments the machine serves as a lathe, planer, jointer, shaper and so on. The invention makes available for the first time a woodworking machine inexpensive enough to be used in home workshops, light manufacturing, model shops and so on, yet capable of handling work which can ordinarily be done only by special expensive heavy machinery of highly complex nature.

The invention is directed toward the body of the machine which serves as a means for supporting the working power tool in any desired position with respect to the work disposed beneath it. The several members of the body are rotatably joined to each other and lockable in any desired position with respect to each other. An extensible shaft is included in the body and provided with a mechanism for extending and retracting the shaft at will, so that a power driven tool carried at the end of the shaft can be moved in a straight line in any desired direction.

The body of the machine is in effect an articulated tool holder or tool carrier with the several members of the body connected by rotatable joints so that the entire body or portions thereof are rotatable on axes which have predetermined positions with respect to the fixed elevated support of the machine.

It is therefore a principal object of the invention to provide a multipurpose woodworking machine which in operating position is suspended from an elevated support such as a wall or ceiling and is usable as a power saw, drill press and the like.

It is a further object to provide a tool holding machine of the character described adapted to operate tools for working wood, metal, plastic, and other cuttable and grindable materials.

It is a further object to provide a tool holder having a body carried on a fixed support and having members movable on two or more relatively perpendicular axes having a fixed orientation with respect to the support, with provision for locking the members in any desired position.

It is a further object to provide a power tool carrier having a body with certain body members rotatably joined to each other, said carrier being adapted for support in an elevated position above the floor area where the carrier may be located, the carrier being arranged so that one body member may be automatically extended or retracted from the body to enable the working tool to be moved at will in a straight line while the body is rotated or is in fixed position.

Other and further objects and advantages of the invention will become apparent from the following detailed description taken together with the drawing, wherein:

Fig. 1 is an isometric showing of a machine embodying the invention.

Fig. 2 is a side view of the machine with one wall broken away to show internal construction.

Fig. 3 is a sectional view taken on lines 3—3 of Fig. 2.

Fig. 4 is a sectional view taken on lines 4—4 of Fig. 2.

Fig. 5 is an isometric showing of a modified support structure usable in the invention.

Fig. 6 is a diagram illustrating a mode of motion of the machine.

Fig. 7 shows a modification of the internal mechanism of the machine.

Fig. 8 shows a modification of the invention.

Fig. 9 shows the disposition of a portion of the machine when used as a vertical drill press.

Fig. 10 shows on an enlarged scale mechanical details of the machine.

In Fig. 1 the machine is shown in its most versatile form. The body of the machine is carried by support members S. These members may be joists in a basement, garage or attic if the machine is located in a home. The support members could be the rafters of a roof, the studs in a wall, or even a pair of suitable brackets attached to the floor, ceiling, any wall, or other location suitably elevated above the floor to provide sufficient space for free movement of the body of the machine with respect to the material to be worked upon.

The machine includes a housing 10, preferably formed as a casting. The housing is a generally box-like structure elongated longitudinally with a tubular sleeve extension 11 having a liner 11' shown in Fig. 2. In the housing are working parts to be described with reference to Figs. 2, 3 and 4. The upper part of the housing is provided with a pair of apertures surrounded by flanges 12 shown in Fig. 1. A cylindrical shaft 13 passes through the housing and is journaled in flanges 12. A pair of mounting sleeves 14 serves as bearing for axial rotation of the shaft 13. Housing 10 rotates with respect to shaft 13 on an axis X—X perpendicular to the support members S. The sleeves 14 are in the form of flanges disposed at the end of a yoke member 6. The yoke member has a neck 7 to which is attached a head plate 8. A U-shaped bracket 1 is attached to the support members S by suitable screws or bolts 16. If the space between the support members is longer than the distance between the ends of the bracket, a spacer member 17 may be used to fill out the excess distance between the support members. The bracket 1 is provided with a circular aperture having a thickened bearing ring 2 in which rotates neck 7. A groove 9 is provided in neck which may be entered the end of a lock handle 3. The handle 3 is threaded at its end and is threaded in a boss 4 which projects from the side of bracket 1, and has a threaded bore which extends through the ring 2 to open on the groove 9. The yoke member 6 is thus freely rotatable on a vertical axis Y—Y with respect to the fixed support S and bracket 1 and may be locked in any position in a horizontal plane by the locking handle 3.

A boss 5 is provided on the lowermost portion of sleeve 14 and extends downwardly therefrom. The boss 5 is provided with a threaded bore which extends through the sleeve and opens on a groove 13' in shaft 13. The lock handle 18 has a threaded end which passes through the bore and serves to lock the shaft against rotation on horizontal axis X—X while permitting rotation of housing 10 in a vertical plane with respect to fixed support S and axis X—X.

In Fig. 5 is shown a modification of this mounting in which the sleeves 14 terminate in flanges 15 which are secured by screws 16 to the support members S, with a spacer 17 provided to take up excess space between the support members. The housing and shaft in this modification are capable of rotation only on the horizontal axis X—X in the vertical plane with respect to the fixed support S.

A plunger shaft 19 shown in Figs. 1, 2 and 3 is mounted in the tubular extension 11 for movement with respect to the housing on an axis W—W which is perpendicular to the axis X—X. A wheel base 20 extends laterally from sleeve extension 11 and serves as a support for hub 21 which carries radial spokes 22 on which are knobs 23. Rotation of the spokes and hub causes movement of the plunger up or down along its axis W—W by a mechanism which will be discussed later. On the outer end of the plunger shaft is attached a motor support or working tool holder 24. The motor support has a sleeve portion 25 which carries a lock knob and screw 26 by means of which the motor support 25 is held to plunger 19. By loosening the lock knob 26, the motor support can be rotated on the plunger shaft in a plane perpendicular to axis W—W. The motor support 24 is a frame-like structure provided with arms 27 near the end of which are pivots 28. The motor 29 is pivotable about an axis Z—Z on the pivots 28. A lock knob and screw 30 is carried on one arm 27 for locking the motor in any desired position with respect to the miter scale 31. The miter scale is disposed in a plane perpendicular to axis Z—Z and is attached to motor support 24. A handle 32 with finger grips 33 is an integral part of the tool holder for use in manually guiding the tool during operation of the machine. A saw blade 34 is secured on shaft 35 of the motor by a nut 36. The aperture 37' in the saw guard 37 permits access to the nut. The blade guard 37 is carried on pivots 28 as a safety device. Instead of the saw blade a chuck 38 shown in dotted lines can be mounted on shaft 35 for holding a drill bit 39 or other working tool. A spring 40 is mounted alongside scale 31, and is attached at the upper end to the frame of motor support 24. The other end terminates in a coil 41 carried on a spool 50 attached to the miter scale 31. This spring serves to restore the motor to its initial position with the blade 34 vertical when lock knob 30 is released. It also serves as a counter-balance to facilitate handling of the motor during adjustment. The levels 42 and 43 are provided on front and side walls of housing 10 to facilitate proper positioning of the machine on its axes during installation and operation thereof.

The motor may be supplied with power via a cable 44. The motor may be a single speed unit. If desired the motor may be designed to run at two or more speeds or the speed may be continuously variable, the particular speed desired being selected by appropriate positioning of the speed controlling and selecting member R.

The internal mechanism of the machine is best shown in Figs. 2, 3 and 4. In order to accomplish movement of the plunger shaft 19 in the sleeve extension 11, there is provided a toothed rack gear 45 attached to the side of the shaft 19. As an alternative the rack teeth can be milled in the side of the shaft 19. The rack teeth mesh through a slot in liner 11' with the teeth of a pinion gear 46 which rotates in a pinion sleeve formed by wheel base 20 as shown in Fig. 10. The pinion is joined to the hub 21 from which the spokes 22 extend. Rotation of the gear 46 by rotating spokes 22 causes axial movement of the plunger shaft. A coil spring 47 is attached at one end to an anchoring screw or pin 48 mounted on the rear wall 49 of the housing 10. The spring is coiled on a spool 50' attached to the plunger shaft 19 and serves to return the shaft to its fully retracted position shown in Fig. 2 since the spring is biased against shaft movement outwardly from the sleeve 11.

The plunger shaft is also capable of an automatic extension movement which is necessary in using the machine to saw material supported in a horizontal plane. Thus in Fig. 1 the working level L of the saw blade is shown to remain constant as the housing 10 rotates on shaft 13, when the saw is moved forward and backward. This movement of the shaft is made possible by a fixed cam member 60 supported on brackets 60' attached to the shaft 13. A cam follower bar 61 carries a ball bearing 51 in its upper end. The ball bearing rolls in contact with the arcuately curved cam member. The cam follower bar slides axially in a hollow rectangular carriage member 52. The cam follower bar has teeth 55 like those of a rack gear which mesh with the teeth in pinion 56. In order to permit access to the teeth 55, a slot 52' is provided in the carriage member 52. The cam follower slides in the carriage member which is movable along the guide rails 62 and 63. The carriage member is attached to the sleeve-like carriage bearings 65 and 64 which ride on the rails 62 and 63. The cam follower bar is movable along the transversely disposed guide rails 62 and 63 since it is attached to cam carriage members 65 and 64 which ride on the rails 63 and 62 respectively. The rails are attached to the side walls of housing 10, so that as the motor support 24 is swung backward or forward in a vertical plane and the housing 10 rotates on shaft 13 on axis X—X, the cam follower bar 61 moves in a direction parallel to axis W—W.

The pinion 56 carries a sprocket 57 whose teeth mesh with the links in a chain 58. The chain is disposed over the sprocket 57 and hangs free at one end $C_1$. At its other end $C_2$ the chain bears on the flat upper surface of plunger shaft 19. The chain is retained in a chute 59. The chute is a channel-like member curved at its upper end so that the chain passes directly from the teeth of the sprocket 57 through the chute. The chute is attached to the side 49 of housing 10 by pins 48 and 53 and serves to keep the chain stiff while moving in the chute.

The pinion 56 is rotated by reason of movement of the cam follower bar at all positions of the bar as it is guided by cam 60, because the teeth 55 of the bar slide along the teeth of the pinion while rotating it. The sprocket 57 rotates with the pinion driving the chain 58 down on the shaft 19 to extend it from sleeve 11. Spring 47 serves to retract the plunger shaft causing the chain to move in the opposite direction over sprocket 57. The end $C_2$ of the chain remains in contact with the shaft 19 at all positions of the shaft. This automatic extension and retraction of the shaft 19 is accomplished merely by swinging the machine on axis X—X as the motor support and blade are moved through a vertical plane parallel to axis Y—Y. Thus the saw blade always moves in a horizontal plane on any predetermined level L.

The particular level of plane L, or stated another way, the desired depth of cut of the blade is fixed by the initial amount of extension of the plunger shaft. This initial position is fixed by means of the depth control knob 66 which rotates on a sleeve 75 attached to a bearing plate 76 as shown in Fig. 4. Attached to the knob 66 is a screw 67. This screw is threaded in the nut 68 which is locked to the screw by a set screw (not shown). The screw is also threaded in the cam follower carriage sleeve 69. Thus as the knob is rotated the cam follower carriage moves forward or backward and the cam follower bar follows the cam 60 to extend or retract the plunger shaft accordingly via pinion 56, sprocket 57 and chain 58. A pair of bearing plates 76 are provided on the sides of the housing to support the guide rails 62, 63, pinion 56 and screw 67. A scale 70 is provided on the exterior of the plunger shaft to indicate the degree of extension of the plunger shaft from the sleeve 11.

The basic equation of motion in a vertical plane of the working tool 34, for straight line travel is $$\Delta D = \frac{D}{\cos \alpha} - D$$

where the working tool moves in a horizontal plane L through an angle $\alpha$, as shown in Fig. 6. The plunger shaft which is initially extended a distance D will extend a distance $\Delta D$. Any mechanism which will accomplish movement of the working tool to satisfy this equation may be used. Thus the working tool could be extended and retracted by any suitable means either as shown in the drawings, or by a lazy tongs mechanism or otherwise. The internal mechanism may also be simplified as shown in Fig. 7 if the amount of travel of the working tool in plane L is limited. As shown in Fig. 7 the plunger shaft 19 carries a guide plate 53 at its upper end. The lower end of the bar 61 carries a ball bearing 54 which rides in a groove 74 in plate 53. In this modification the gear 56, sprocket 57 and chain 58 are omitted.

In operation of the machine as a vertical drill press, a chuck 38 will be inserted in aperture 37' of the guard 37 and attached to shaft 35 of the motor. If desired the guard may have a removable exterior side plate 77 to allow more convenient access to the shaft of the motor. Screws 71 will be provided for securing plate 77 to the body of the guard 37. The motor will then be tilted on axis Z—Z to dispose the drill bit 39 vertical, as shown in Fig. 9, with the motor located within yoke A of the motor support 24. Tightening of lock knob 30 will lock the drill bit and chuck in a vertical position. The lock knob 18 will be tightened to lock the shaft 13 to bracket sleeves 14. Housing 10 will be disposed in a vertical position which the operator will determine by use of levels 42, 43. Handle 3 will also be tightened. By turning knob 66 the shaft 19 will be extended to a desired initial position. After the motor is turned on, the turning of spokes 22 will extend the shaft 19 and lower the drill bit. Release of the spokes will permit the spring 47 to retract the plunger shaft. To operate the machine as a drill press with the drill bit disposed at any desired angle with respect to vertical axis Y—Y, the machine will be set up as for vertical drilling but with housing 10 rotated on shaft 13 to dispose axis W—W of the plunger shaft at any desired angle with respect to axis Y—Y. The lock knob 18 may be loosened in disposing the housing in the desired angular position. When spokes 22 are turned, the drill bit 39 will move on axis W—W.

To operate the machine with the drill bit disposed at any desired angle in a horizontal plane the motor support 24 should be rotated on shaft 19 to the desired horizontal angular position. This is done by releasing lock knob 26. The sleeve 25 of the motor support carries a plurality of set screws 72 which project into and ride in a channel 73 as shown in Fig. 2 located circumferentially near the end of shaft 19. The motor support will be turned to the desired horizontal position and knob 26 will be locked. Then the motor shaft and drill bit will be disposed horizontally and knobs 18 and 30 will be tightened. The machine can now be used as a horizontal drill by feeding the work into the drill bit.

To operate the machine as a saw for vertical cuts the motor will be tilted on axis Z—Z to a horizontal position. The motor support will be locked on shaft 19 in the position shown in Fig. 1. The depth of cut will be set by adjustment of lock-knob 66. Turning of this knob as explained above pushes the cam follower bar along cam 60, causing downward movement of the bar to rotate pinion 56, sprocket 57 and feed chain 58 through the guide chute 59. The plunger shaft will thus be set to the desired depth of cut. Scale 70 on shaft 19 facilitates this adjustment. It is now only necessary to pull handle 32 forward after the motor is turned on and set to desired speed. As shown in Fig. 1 in dotted lines, the saw blade is held to a constant level L of movement as the plunger shaft 19 is automatically extended. The amount of extension of the shaft is a function of the angle of rotation of the housing 10 with respect to shaft 13 the vertical axis Y—Y, and is determined by the shape of cam 60. As the tool holder is restored to the initial position the plunger shaft automatically retracts, always keeping saw blade 34 moving in the same horizontal plane on level L.

To set up the machine to execute compound miter cuts, the body of the machine will be rotated on axis Y—Y to a desired angular position by loosening handle 3, then tightening the handle with the body in the desired position. The motor suport will be rotated on axis W—W to the same angular position and locked there by knob 26. The motor will be tilted on axis Z—Z to a desired oblique plane and locked there by knob 30.

In execution of any horizontal miter cut the machine operates as a radial saw. If the modification of Fig. 5 is used, the machine can only execute vertical miter cuts. To make horizontal miter cuts the work under the blade must be moved in plane L to the desired angular position for the miter cut.

In Fig 8 is shown a modification of the invention, in which the drill bit 39 is driven by a remotely located motor 84 via a suitable mechanical transmission means. The shaft of the motor 84 carries a stepped speed changing pulley 83 which drives the stepped speed changing pulley 85 via belt 82. Pulley 85 is mounted on shaft 97 which rotates in bearings 86, 86' carried by housing supports 98, 99. The lower portion of the shaft 97 has a splined section 87. The sleeve shaft 94 is provided with an inwardly extending portion of its upper end provided with teeth which engage in the grooves of splined section 87 so that the sleeve shaft moves longitudinally with respect to shaft 97. Plunger shaft 19 is shown in Fig. 8 carried by bearings 95, 96 on sleeve shaft 94. The chuck 38 is attached to the sleeve shaft and retains drill bit 39. By the arrangement shown the machine can be operated as a drill press as heretofore described.

In Fig. 8 the collar 25 is shown carrying a spindle support bracket 88. The bracket also carries vertically disposed pulleys 90, 93. A pulley 91 is carried on the lower end of sleeve shaft 94 and serves to drive pulleys 90, 93 via belt 89. Pulley 93 is mounted in spindle 92 which carries saw blade 34. The guard 37 which supports the spindle and blade is pivotal on bracket 88 on a horizontal axis corresponding to axis Z—Z as shown by arrow 100. The embodiment shown in Fig. 8 may include the cam 60 and cam follower 61 together with the other members necessary to lower shaft automatically and to control the depth of cut as shown in Figs. 1 to 4, 7 and 10. Thus the embodiment of Fig. 8 is capable of performing all operations which the previously described embodiments can perform. In order to use the embodiment of Fig. 8 as a saw, the drill bit 39 will be removed. To use the machine as a drill, the saw blade and guard will be removed.

When the machine is not in use it can easily be swung upward to engage handle 32 on a suitable hook (not shown) located in one of the elevated supports S, thus completely clearing the normal work area where the machine is located.

The machine will be operable as a lathe if the housing 10 is locked in a vertical position and a suitable head stock spindle is chucked on the shaft 35 of the motor 29 or on shaft 92. The shaft may be locked to rotate the spindle in any desired position and a free running tail stock spindle (not shown) should be disposed in alignment with the head stock spindle at any desired distance. The machine will thus operate as a lathe of a capacity limited only by the spacing of the spindles. Any other type of tool such as router, shaper, grinder, buffer, sander, planer and the like, may be readily attached to the shaft of the motor. The ready adaptability of the machine for performing many operations customarily requiring a diversity of power tools will be apparent from the foregoing description.

Although only a limited number of embodiments have been disclosed it will be obvious to those skilled in the art that many changes and modifications are possible without departing from the scope of the invention as defined by the appended claims.

What is claimed and desired to protect by Letters Patent of the United States is:

1. A power tool, comprising a first shaft, a body member journaled on said shaft and rotatable thereon angularly in a plane perpendicular to the axis of the shaft, a plunger shaft disposed to move longituidinally into and out of said member in said plane, a tool holder secured to one end of said plunger shaft to support rotatably a drill and a saw blade, a first mechanism disposed operatively between the body member and plunger shaft for rapid extension and retraction of the plunger shaft with respect to said member, a second mechanism operatively connecting the first shaft and plunger shaft and arranged to extend the plunger shaft a distance from said first shaft depending on the amount of angular rotation of said member with respect to the first shaft, and a third mechanism operatively connected between the body member and said second mechanism to extend the plunger shaft a fixed distance with respect to said member independently of the angular rotation of the body member, said first mechanism comprising a manually operable gear means engaged with said plunger shaft and a spring connected between the plunger shaft and said body member.

2. A power tool, comprising a bracket adapted for attachment to an elevated support, a yoke member attached to said bracket and rotatable thereon on a vertical axis, a first shaft rotatable in said yoke member with the axis of the shaft disposed horizontally, locking means for retaining the first shaft in a fixed position with respect to said yoke member and bracket, a hollow body member journaled on said shaft and rotatable thereon in a vertical plane, a plunger shaft disposed to move longitudinally into and out of said member in said vertical plane, a tool holder secured to one end of the plunger shaft and rotatably supporting a drill and a saw blade, a first mechanism disposed operatively between the body member and plunger shaft for rapid extension and retraction of the plunger shaft with respect to said member during a drilling operation, a second mechanism operatively connecting the first shaft and plunger shaft for extension movement of said plunger shaft relative to said body member depending on the amount of angular rotation of said body member with respect to the first shaft during a sawing operation, said second mechanism so extending said plunger shaft that the tool holder moves in a horizontal plane during the angular rotation of said body member, and a third mechanism operatively connected between the body member and said second mechanism to extend the plunger shaft a fixed distance with respect to said body member independently of the angular rotation of the body member, to regulate the depth of cutting during said sawing operation.

3. A power tool, comprising a first shaft, a body member journaled on said shaft and rotatable thereon angularly in a plane perpendicular to the axis of the shaft, a plunger shaft disposed to move longitudinally into and out of said member in said plane, a first mechanism disposed operatively between the body member and plunger shaft for rapid extension and retraction of the plunger shaft with respect to said member, and a second mechanism operatively connecting the first shaft and plunger shaft and arranged to extend the plunger shaft a distance from said axis, depending on the amount of angular rotation of said member with respect to the first shaft, said first mechanism comprising a manually operable gear means engaged with said plunger shaft, and a spring connected between the plunger shaft and body member, said second mechanism comprising a cam plate connected to said first shaft, a cam follower carried by said body member and engaging said cam plate, and a chain contacting said plunger shaft and driven by sprocket and gear means actuated by movement of said cam follower.

4. A power tool, comprising a first shaft, a body member journaled on said shaft and rotatable thereon angularly in a plane perpendicular to the axis of the shaft, a plunger shaft disposed to move longitudinally into and out of said member in said plane, a tool holder secured to one end of said plunger shaft to support rotatably a drill and a saw blade, a first mechanism disposed operatively between the body member and plunger shaft for rapid extension and retraction of the plunger shaft with respect to said member, a second mechanism operatively connecting the first shaft and plunger shaft and arranged to extend the plunger shaft a distance from said first shaft depending on the amount of angular rotation of said member with respect to the first shaft, and a third mechanism operatively connected between the body member and said second mechanism to extend the plunger shaft a fixed distance with respect to said member, said first mechanism comprising a manually operable gear means engaged with said plunger shaft, and a spring connected between the plunger shaft and said body member, said second mechanism comprising a cam plate connected to said first shaft, a cam follower carried by said body member and engaging said cam plate, and a chain contacting said plunger shaft and driven by sprocket and gear means actuated by movement of said cam follower, said third mechanism comprising a manually operable gear means disposed to move said cam follower.

5. A power tool, comprising a bracket adapted for attachment to an elevated support, a first shaft rotatable in said bracket with the axis of the shaft disposed horizontally, locking means for retaining the first shaft in a fixed position with respect to said bracket, a hollow body journaled on said shaft and rotatable thereon in a vertical plane, a plunger shaft disposed to move longitudinally into and out of said member in said vertical plane, a tool holder secured to one end of the plunger shaft for rotatably supporting a drill and a saw blade, a first mechanism disposed operatively between the body member and plunger shaft for rapid extension and retraction of the plunger shaft with respect to said member, a second mechanism operatively connecting the first shaft and plunger shaft and arranged to extend the plunger shaft a variable distance from said first shaft depending on the amount of angular rotation of said body member with respect to the first shaft during a sawing operation, said second mechanism so extending said plunger shaft that the tool holder moves in a horizontal plane during the angular rotation of said body member, and a third mechanism operatively connected between the body member and said second mechanism to extend the plunger shaft a fixed distance with respect to said body member independently of the angular rotation of the body member, to regulate the depth of cutting during said sawing operation, said first mechanism comprising a manually operable gear means engaged with said plunger shaft, and a spring connected between the plunger shaft and said body member, said second mechanism comprising a cam plate connected to said first shaft, a cam follower carried by said body member and engaging said cam plate, and a chain contacting said plunger shaft and driven by sprocket and gear means actuated by movement of said cam follower, said third mechanism comprising a manually operable gear means disposed to move said cam follower.

6. A power tool, comprising a first shaft, a body member journaled on said shaft and rotatable thereon angularly in a plane perpendicular to the axis of the shaft, a plunger shaft disposed to move longitudinally into and out of said member in said plane, a sleeve shaft longitudinally disposed in the plunger shaft and rotatable with respect to the plunger shaft, said sleeve shaft carrying a chuck on one end thereof, a splined shaft rotatably supported in said body member, said sleeve shaft being slidably engaged with the splined shaft, a first mechanism disposed operatively between the body member and plunger shaft for rapid extension and retraction of the plunger shaft with respect to said member, said first mechanism comprising a manually operable gear means engaged with said plunger shaft and a spring connected between the plunger shaft and said body member, a second mechanism operatively connecting the first shaft and plunger shaft a distance from said first shaft and arranged to extend the plunger shaft a distance from said first shaft depending on the amount of angular rotation of said member with respect to said first shaft, a third mechanism operatively connected between the body member and said second mechanism to extend the plunger shaft a fixed distance with respect to said body member independently of the angular rotation of the body member, and a motor means carried by said body member and operatively arranged to drive the splined shaft.

References Cited in the file of this patent
UNITED STATES PATENTS

| | | |
|---|---|---|
| 370,962 | Martin | Oct. 4, 1887 |
| 589,003 | Luther | Aug. 31, 1897 |
| 969,505 | Wylie | Sept. 6, 1910 |
| 1,748,446 | Gatzsch | Feb. 25, 1930 |
| 1,766,650 | Kistner et al. | June 24, 1930 |
| 1,795,709 | Carter et al. | Mar. 10, 1931 |
| 1,822,155 | Landsborough | Sept. 8, 1931 |
| 2,146,202 | Davenport | Feb. 7, 1939 |
| 2,546,277 | Schwandt | Mar. 27, 1951 |
| 2,569,354 | Tracy | Sept. 25, 1951 |
| 2,621,686 | Tompkins | Dec. 16, 1952 |
| 2,672,170 | Johnson | Mar. 16, 1954 |